(12) United States Patent
Busse et al.

(10) Patent No.: US 7,451,808 B2
(45) Date of Patent: Nov. 18, 2008

(54) EXCHANGING DEVICE FOR MOTOR VEHICLES

(75) Inventors: Gunnar Busse, Royal Oak, MI (US); Frank Wolf, Hoechst (AT)

(73) Assignee: Behr GmbH & Co., Stuttgart (DE)

( * ) Notice: Subject to any disclaimer, the term of this patent is extended or adjusted under 35 U.S.C. 154(b) by 691 days.

(21) Appl. No.: 10/943,340

(22) Filed: Sep. 17, 2004

(65) Prior Publication Data
US 2006/0060340 A1    Mar. 23, 2006

(51) Int. Cl.
*B60H 1/00* (2006.01)

(52) U.S. Cl. .................. 165/202; 62/238.7; 62/244

(58) Field of Classification Search .............. 165/202, 165/203, 204, 42, 43, 44; 62/238.7, 244; 237/12.3 A, 12.3 B, 12.3 R
See application file for complete search history.

(56) References Cited

U.S. PATENT DOCUMENTS

| | | | |
|---|---|---|---|
| 4,697,434 A * | 10/1987 | Yuyama | 62/238.7 |
| 4,949,553 A * | 8/1990 | Suzuki | 165/42 |
| 5,971,290 A * | 10/1999 | Echigoya et al. | 237/12.3 B |
| 2002/0014330 A1 | 2/2002 | Guyonvarch | |
| 2004/0000161 A1 | 1/2004 | Khelifa et al. | |

FOREIGN PATENT DOCUMENTS

| | | |
|---|---|---|
| DE | 196 29 084 | 1/1998 |
| DE | 198 50 829 | 3/2003 |
| EP | 1 176 036 | 1/2002 |

* cited by examiner

*Primary Examiner*—Ljiljana (Lil) V Ciric
(74) *Attorney, Agent, or Firm*—Leydig, Voit & Mayer, Ltd.

(57) ABSTRACT

An arrangement of components for exchanging heat for motor vehicles with multiple cooling circuits comprising at least one pump, at least one control device and at least one heat exchanger. The arrangement is characterized in that a first cooling circuit is selectively connected with at least one or more additional cooling circuits to transfer thermal energy, and a selective fluid connection is provided between the additional cooling circuits by means of at least one control element.

5 Claims, 6 Drawing Sheets

EXCHANGING DEVICE FOR MOTOR VEHICLES

FIELD OF THE INVENTION

The present invention relates to a heat exchanging device for motor vehicles and, in particular, a heat exchanging device heat comprising at least three cooling circuits.

Devices for exchanging heat produced by motor vehicles are known in the prior art. German patent publication DE 196 29 084, for example, shows a cooling system that cools a fuel cell system. According to the teaching of this publication, transport of the coolant is affected by the dynamic pressure of an air stream generated by a moving vehicle. The German patent publication DE 198 50 829, as another example, describes a cooling-heating circuit for elevating or cooling vehicle units. A disadvantage of the approach suggested by this publication is that waste heat from a source of energy only ensures optimal temperature control of the unit itself and only under specific operating states. Yet another patent publication, EP 1 176036, discloses cooling-heating circuits that do not provide a combination of the heating and cooling circuits provided in the vehicle for temperature control of vehicle units.

The present invention provides a device for exchanging heat that overcomes the disadvantages known from the prior art and further optimizes heat transfer to and from various components and systems in a vehicle.

SUMMARY OF THE INVENTION

A preferred embodiment of the inventive heat exchanging device for motor vehicles comprises at least three cooling circuits and further includes at least one pump, at least one control device, and at least one heat exchanger. In this preferred embodiment, at least two heat exchangers and at least one heat reservoir are arranged within a first cooling circuit. A second cooling circuit exchanges energy in the form of heat with one component part of the vehicle, and a third cooling circuit exchanges energy in the form of heat with a second component part of the vehicle. The device of this embodiment is further characterized in that the first cooling circuit is connected with the second and/or third cooling circuits to transfer thermal energy. Further, a selective fluid connection is provided between the second and third cooling circuits by means of at least one control element.

In this preferred embodiment, a first heat exchanger exchanges thermal energy from the first cooling circuit between the ambient air of the vehicle and a coolant fluid. Thermal energy from the first cooling circuit is further exchanged between the coolant fluid of the first cooling circuit and the coolant fluid of the third cooling circuit.

A heat reservoir, which may be incorporated in a first cooling circuit, can be at least one vehicle component that is coupled to a cooling circuit. Other components may be selected from a group of components including, for example, engines such as combustion engines, transmissions, cooling circuits and corresponding coolant fluids, ambient air, electric heating elements, electronic heating elements such as PTC elements, exhaust gases such as combustion gases of an engine, combinations thereof and the like.

In a particularly preferred embodiment of the present invention, the first cooling circuit transfers thermal energy from the third cooling circuit. However, the present invention includes at least one cooling circuit that also transfers thermal energy to at least one-third cooling circuit.

According to a further particularly preferred embodiment, the first cooling circuit comprises two sub-circuits wherein at least one sub-circuit transfers thermal energy to the third cooling circuit and the other sub-circuit transfers thermal energy from the third cooling circuit.

Heat between the individual cooling circuits is transferred by use of at least one heat exchanger, wherein the heat exchanger of the present invention is understood to mean a device such as a condenser, cooler or evaporator as they are known from the prior art in various constructions for use with different coolant fluids. Such heat exchangers can exchange both heat between fluids of identical states of aggregation and energy between fluids of different states of aggregation. In particular with air-cooled heat exchangers, at least one cooling fan is used to ensure an adequate transfer or supply of heat.

The control elements of the present invention are in particular understood to mean valves selected from a group of elements including for example computer-controlled or mechanically operated two-way valves, three-way valves, four-way valves, five-way valves, combinations thereof and the like.

The control elements further can be equipped with an expansion element, such as thermostatic expansion valves.

As specified above, the device for exchanging heat serves to control or regulate the temperature of vehicle components, which according to an embodiment of the invention are selected from a group of components including for example electric and electronic components such as electric motors, performance electronics, control electronics, batteries, accumulators including fuel cells, combinations thereof and the like. However, the present invention includes temperature control of mechanical vehicle components such as transmissions and the like. Combinations of different components are also included in the scope of the present invention.

In a particularly preferred embodiment, the vehicle components whose temperatures are to be controlled are classified in at least two groups which according to the present invention are cooled or heated, respectively, i.e. temperature-controlled by means of at least one second cooling circuit or by means of at least one third cooling circuit.

According to another particularly preferred embodiment, the sequence of flow through the vehicle components is coordinated depending on the operating temperature required. For example, the sequence will depend on which vehicle components are to be cooled and the flow may be first directed through those components whose set operating temperature is the lowest.

According to another particularly preferred embodiment, at least one first cooling circuit comprises a heat exchanger that serves to control the temperature of air inside a passenger compartment. Such heat exchangers, as they are for example used to heat or cool the air inside a vehicle, are known in the prior art.

Moreover, such heat exchangers may, if required, be equipped with additional components, such as PTC elements, in order to provide additional thermal energy. The source of energy for such exchanges may include, for example, a combustion engine that supplies low waste heat to sufficiently heat the air inside a passenger compartment.

According to another preferred embodiment of the present invention, heat exchangers are arranged within at least one cooling circuit wherein the individual components such as the primary source of energy or the heat exchanger for the air flow, or an additional heat exchanger for the third cooling circuit, can be interconnected by means of control elements such that the corresponding coolant fluid flows through both individual components and combinations of various components.

The preferred control elements are two-way or three-way valves wherein the individual components may be connected in parallel.

The heat exchange fluids according to the present invention are understood to include coolants such as water with or without additives (such as glycerin), and refrigerants including substantially waterless media such as R134A, R12, and further media such as $CO_2$.

A mix of coolants are preferred for use in a particularly preferred embodiment, wherein one first cooling circuit uses one type of coolant and another cooling circuit uses a different type of coolant fluid.

A distinction is made in the use of a coolant for transfer of heat from a fuel engine to other vehicle components wherein the coolant preferably elevates the temperature of the vehicle components directly or indirectly. According to the present invention, this object can be achieved in that the relevant coolant circuit is thermally conductively connected with another cooling circuit, such as a second or third cooling circuit, via a heat exchanger so as to allow the coolant fluid to be heated in the second or a third cooling circuit. Heat is then transferred to the vehicle component as the coolant fluid is correspondingly guided toward or around or through the respective vehicle components.

According to another preferred embodiment, the first cooling circuit includes a refrigerant as the coolant that transfers thermal energy from the air flow guided into the passenger compartment of a motor vehicle. This type of circuit has been used in the prior art in air conditioning systems to control the temperature inside of vehicles and may comprise at least one further heat exchanger that directly or indirectly controls the temperature of further vehicle components. In a preferred embodiment of the invention, however a heat exchanger is connected in parallel to a cooling circuit wherein control elements are arranged in front of a heat exchanger or a compressor, respectively as seen in the direction of flow, and which by acting as thermostatic expansion valves influence the amount of flow thereby influencing the pressure ratio or the phase transition of the refrigerant fluids.

According to one embodiment of the invention, thermal energy is transferred between the vehicle components and the coolant fluid by at least one additional heat exchanger in which thermal energy is transferred, for example, from the second or third cooling circuit.

According to a preferred embodiment, the heat exchanger used for the exchange of heat between a refrigerant and a coolant is a stacked-plate heat exchanger. This device is appropriate for the transfer of heat between a coolant in a stable phase and a refrigerant in changing phases.

The embodiments of the present invention may further be used in motor vehicles such as fuel engine vehicles, but also in hybrid cars and/or electric cars featuring fuel cells. The invention may be used to control the temperature level of various vehicle components by supplying thermal energy to or transferring it from components. According to a preferred embodiment, the device is used in a motor vehicle comprising at least one radiator and one device for conditioning the air inside the passenger compartment of the vehicle.

Further examples and embodiments of the present invention are described below with reference to the drawings and the description of the figures. The teaching of the present invention, however, is not to be considered restricted by the following description.

DETAILED DESCRIPTION OF PREFERRED EMBODIMENTS

Accumulators are used as a power source both in conventional vehicles and in hybrid or electric cars. Nickel-metal-hydride accumulators (NiMe) typically require an optimal operating range that leads to a core temperature of between 5° C. and 35° C. (41° F.-95° F.). At temperatures above 55° C. (131° F.), damage to or destruction of the accumulator may occur. In contrast, conventional lead-acid accumulators exhibit problems at low temperatures that can be overcome by heating. Operating conditions for batteries or accumulators must therefore be optimized in, among other things, vehicles featuring a plurality of electric devices, which requirement is met by cooling and heating.

In order to cool accumulators, a device such as a low-temperature circuit can be constructed, for example, via a separate or primary radiator of the vehicle. However, this is usually viable only for ambient temperatures of up to approximately 25° C. (77° F.). Given the current development stage of battery and accumulator technology, higher ambient operating temperatures must be avoided with a conventional low temperature circuit.

Alternatively, at high ambient temperatures, the accumulator can be cooled by means of a refrigeration cycle such as an air conditioning system. In doing this, a further heat exchanger must be added to the refrigeration cycle and incorporated into the circuit of the accumulator cooler. This causes the heat of the accumulator to be transferred into the refrigeration cycle of the air conditioning via the accumulator circuit.

It also may be necessary to heat the accumulators, which may be accomplished by extending a conventional heating circuit of a motor vehicle. To this end, the fluid of the heating circuit flows through another heat exchanger that is incorporated in the heat exchanger circuit of the accumulator.

Figure 1:
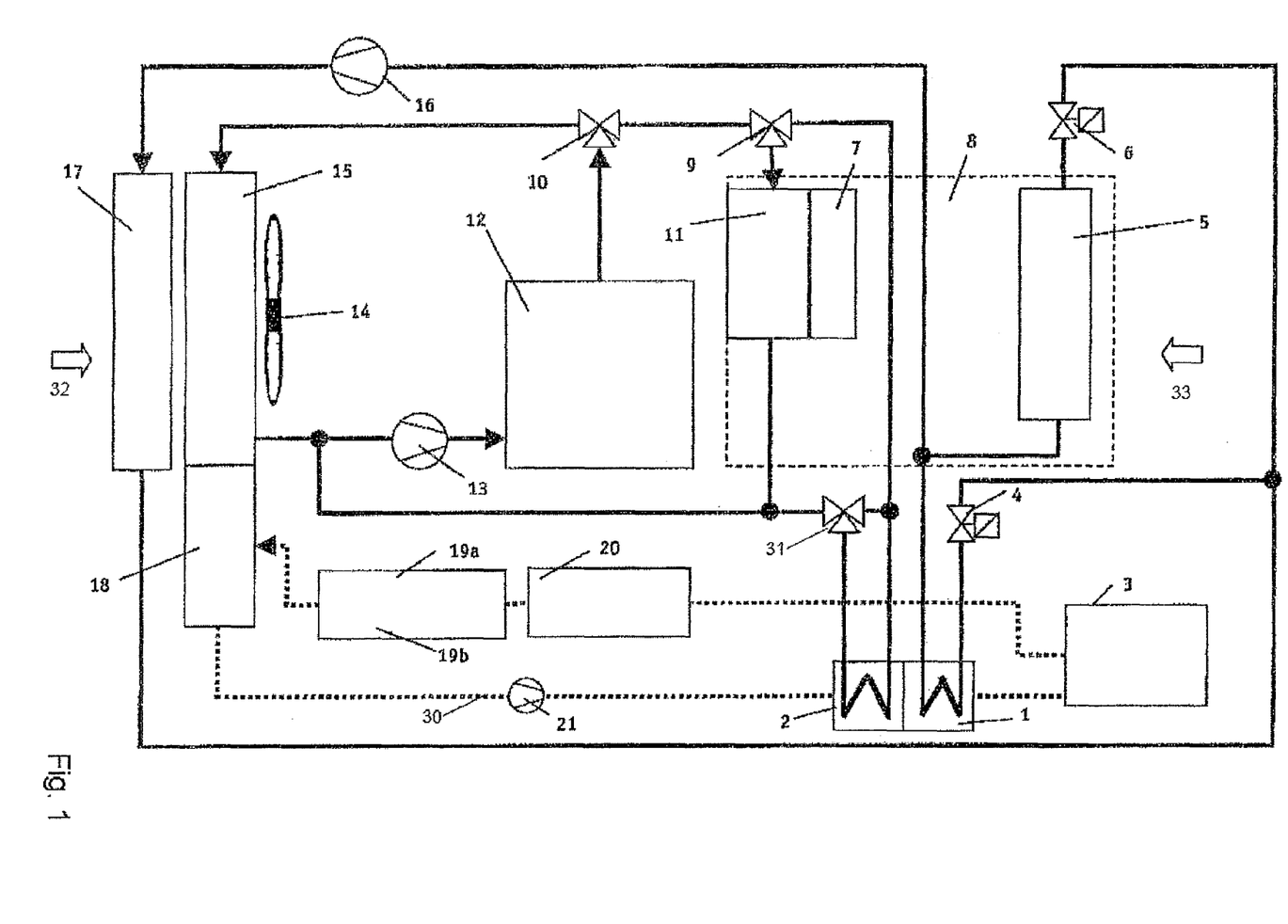
FIG. 1 is schematic illustration of a device for exchanging heat for motor vehicles comprising two cooling circuits and a further cooling circuit to control the temperature of vehicle components.

FIG. 1 is a schematic illustration of a device including a plurality of heat exchange circuits, which may be used, for example, in connection with an accumulator or battery. The figure shows two heat exchangers that according to a preferred embodiment may be designed as stack heat exchangers as further described below.

Reference numeral 3 designates a source of energy, such as a battery or an accumulator, through or around which the fluid of the circuit 30 flows. Reference numerals 4 and 6 designate control elements, such as thermostatic expansion valves, which control the quantity of flow of the coolant and further function as an expansion element for the refrigerant. Reference numeral 5 designates an evaporator for the passenger compartment. Reference numeral 11 shows the heat exchanger for a primary heating system supplemented by a PTC element 7. In the embodiment of FIG. 1, components 5, 7 and 11 are combined to form the elements of an air conditioning system 8 in order to control, i.e. elevate or lower, the temperature of the air flow into the passenger compartment. Reference numerals 9 and 31 illustrate further control elements, such as three-way valves, that control both the quantity and direction of flow of the fluid. These valves permit heat to be transferred from the engine to the passenger compartment and/or to heat the fluid in the accumulator circuit.

Reference numeral 12 designates an engine. Reference numeral 13, in turn, represents a pump for a primary heating circuit. In order to sufficiently remove heat transferred from the motor to the coolant, a heat exchanger 15 can be exposed to air from an air stream entering a moving vehicle. A fan 14 may supply an additional volume of air. A compressor 16 conveys the refrigerant of the cooling circuit of the air conditioning system back to the evaporator 5 via a condenser 17, for cooling the air inside the passenger compartment.

In the embodiment illustrated in FIG. 1, the coolant circuit is shown without a control element so that the coolant flows successively through the vehicle components 3, 19, and 20. Pump 21 further forces the flow of the coolant.

The circuit of FIG. 1 further includes a heat exchanger 18 intended to ensure adequate temperature control of the vehicle components 3, 19, and 20 in at least one operating mode, in particular at mild temperatures. In a preferred embodiment, heat exchangers 1 and 2 are switched off in a first operating mode, and in a second operating mode, such as when the ambient temperatures are high, for example above 20 to 25° C. (68° F. to 77° F.), one or both of heat exchanges 1 and 2 may be switched on.

At temperatures below 5° C. (41° F.), the coolant typically must be heated. This may be accomplished by switching on the heat exchanger 2, and supplying heat from the primary heating system of the engine or from a general source of heat, respectively.

The direction of flow between the ambient air and the heat exchangers is indicated with the arrow 32 and the direction of flow of the air inside the passenger compartment is indicated with the arrow 33 in FIG. 1.

Through the use of the inventive arrangement of heat exchangers and multiple circuits as illustrated in FIG. 1, it is possible to cool the electric electronic and/or mechanical components in a circuit 30. This circuit comprises at least one heat exchanger 18, one auxiliary pump 21 and further components. Depending on the required operating temperatures, the circuit starts for example at the heat exchanger, and the flow then travels first to the accumulators, then to the electronic/electric/mechanical components. To ensure temperature control of the battery, heat exchangers for heating or cooling the coolant also may be provided.

Cooling the electric/electronic/mechanical components in the vehicle can further be effected with the aid of a refrigeration cycle that includes at least a compressor 16, a condenser 17, an evaporator for the air inside the passenger compartment 5, one expansion valve with incorporated stop valve 6 and various other components such as pipe and tube connections, supply and suction elements, and temperature and pressure sensors. At the refrigerant side, a further element is added so as to allow, for example, a cooling of the battery or the accumulator. Further, at least one other evaporator, one expansion element or expansion valve with integrated stop valve 4 as well as other stop or control elements for the ventilator 5, as for the evaporator 1, may be provided.

In the arrangement illustrated in FIG. 1, the temperature of components within the circuit 30 are controlled by a circulating coolant wherein the refrigeration device can be connected as necessary. Connecting the refrigeration device results in increased load in the refrigeration cycle, which may affect, for example, the air conditioning system. However, this load can be reduced by further measures, as described below and illustrated in FIG. 4. For example, two separate circuits are used here, comprising one radiator for the electric/electronic/mechanical components to be cooled and one radiator for cooling the battery/accumulator by means of the cooling system.

Figure 2:
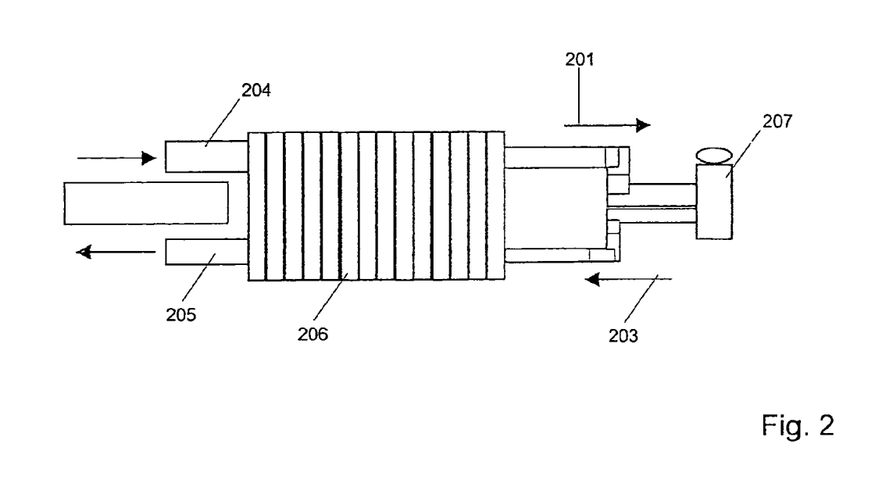
FIG. 2 is a schematic illustration of a two-way stacked-plate heat exchanger.

FIG. 2 is a schematic diagram of a two-way stacked-plate heat exchanger that, according to a particularly preferred embodiment of the present invention, is used to exchange heat between coolant and refrigerant. The refrigerant, such as R134A, is supplied to the heat exchanger via the pipes along the arrow 203 and carried away via pipes in the direction of flow 201. A valve 207 controls a supply of refrigerant into the stacked-plate heat exchanger, which according to a particularly preferred embodiment, includes a thermostatic expansion valve.

Reference numeral 206 designates one of a plurality of the heat exchanger plates that, in total substantially form the stacked-plate heat exchanger. The supply pipes 204 further serve to supply a coolant to the heat exchanger and carry it away along the flow path 205.

Figure 3:
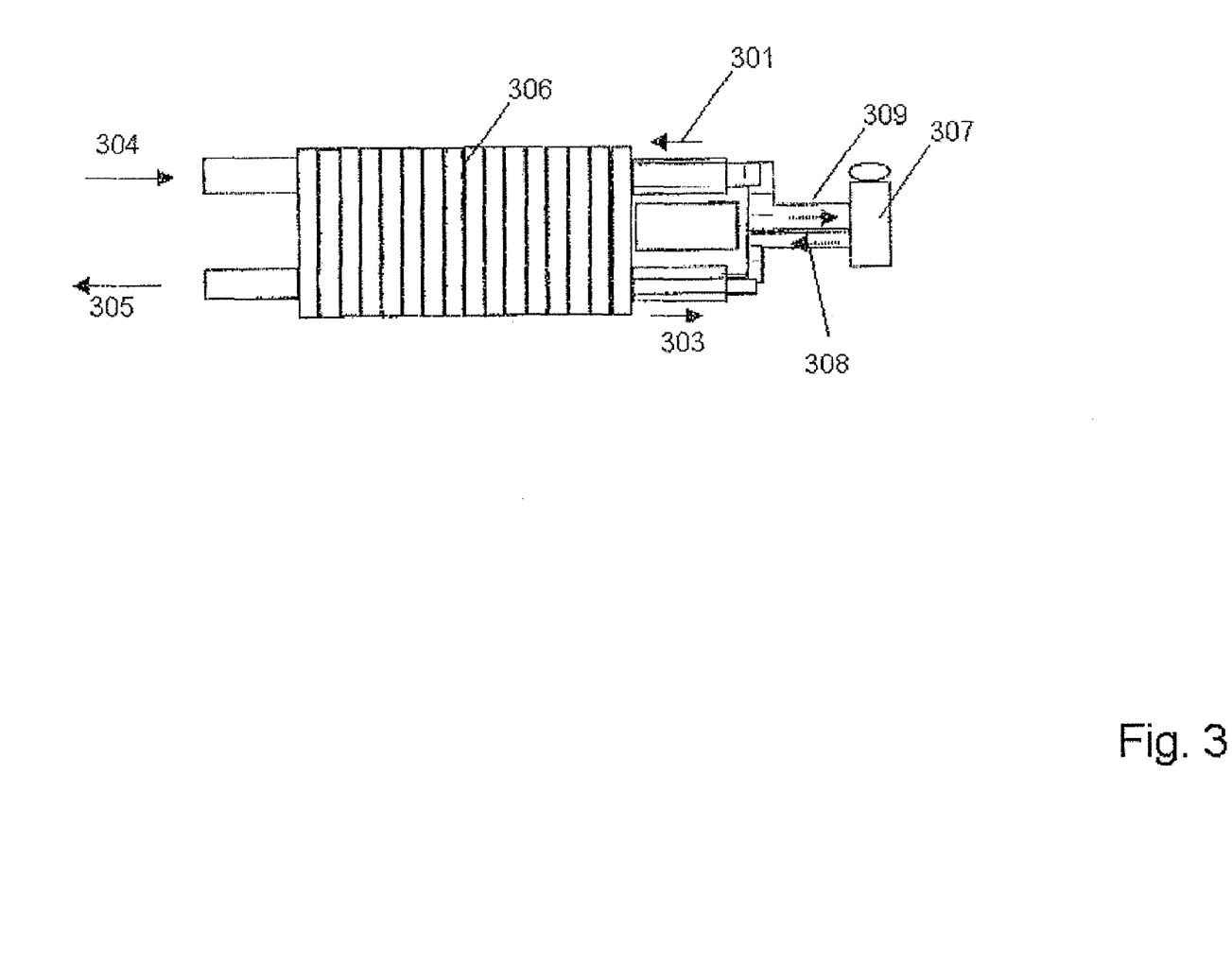
FIG. 3 is a schematic illustration of a three-way stacked-plate heat exchanger.

FIG. 3 is an embodiment of a three-way stacked-plate heat exchanger. In this embodiment, a first coolant consisting, for example, of water and antifreeze (Glysantin) is supplied to the heat exchanger along the flow path 304 and carried away along the flow path 305. A further coolant is supplied to the heat exchanger along the flow paths 301 and carried away along the flow path 303. Finally, flow paths 308 and 309 may be used to supply a refrigerant, such as R334A, to and from the heat exchanger. Reference numeral 307 designates a control element, which according to a particularly preferred embodiment is a thermostatic expansion valve.

Figure 4:
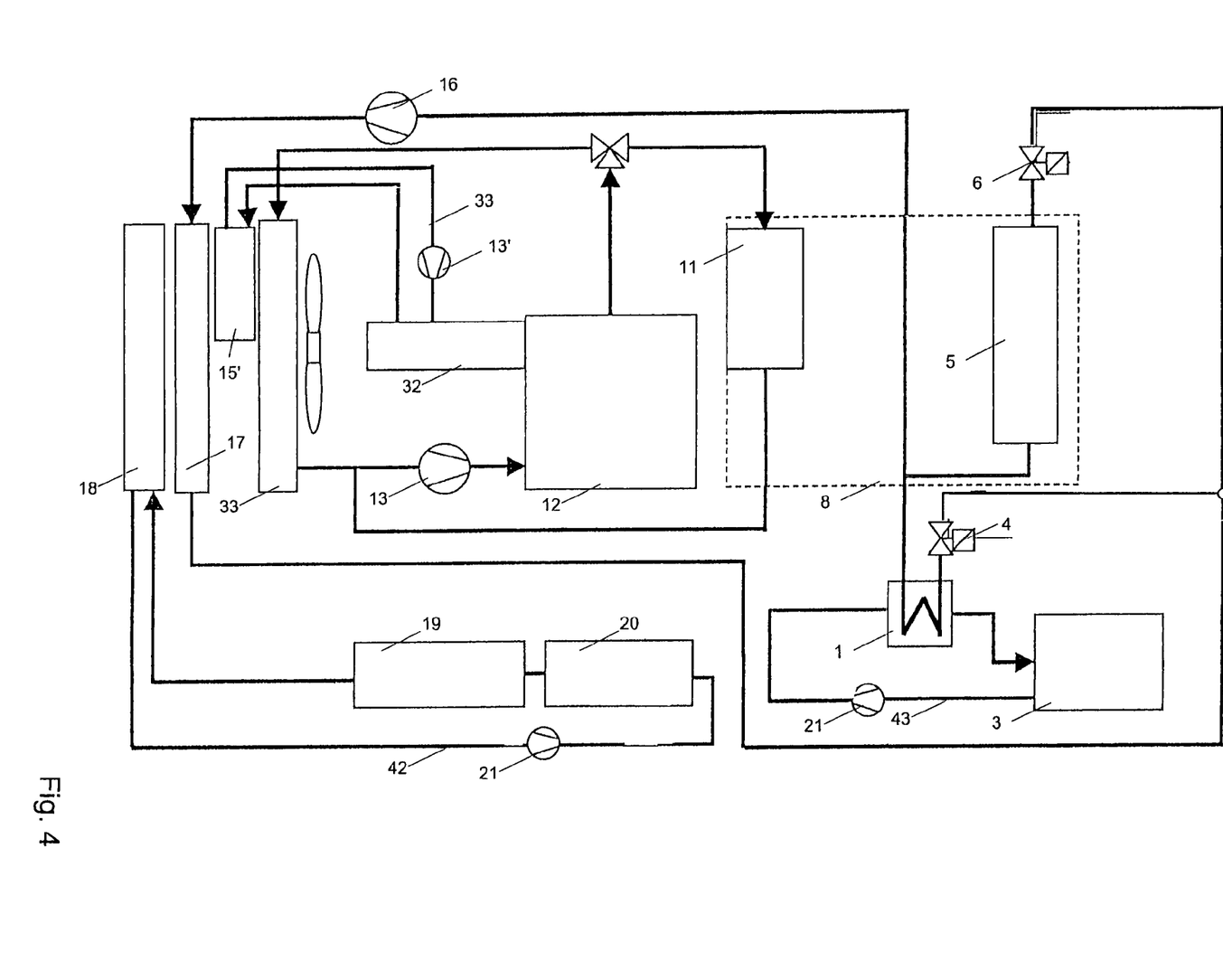
FIG. 4 is a schematic illustration of a device for exchanging heat with separate second and third coolant circuits.

FIG. 4 is a schematic illustration of a system in which additional vehicle components 3, 19, and 20 control the temperature by means of two independent circuits 42, 43. The components 19 and 20 are, for example, connected via a cooling circuit 42 that comprises a heat exchanger 18 and a pump 21. The pump 21 forces a coolant through the circuit 42 for the accumulator 3 and it is connected via a heat exchanger 1 with the refrigeration cycle of the air conditioning system. The primary heating circuit of the engine 12 comprises another circuit 43 for the component 32, which may for example be a transmission. The temperature of the latter is controlled, preferably lowered, by a cooling circuit comprising a pump 13' and a heat exchanger 15'.

Figure 5:
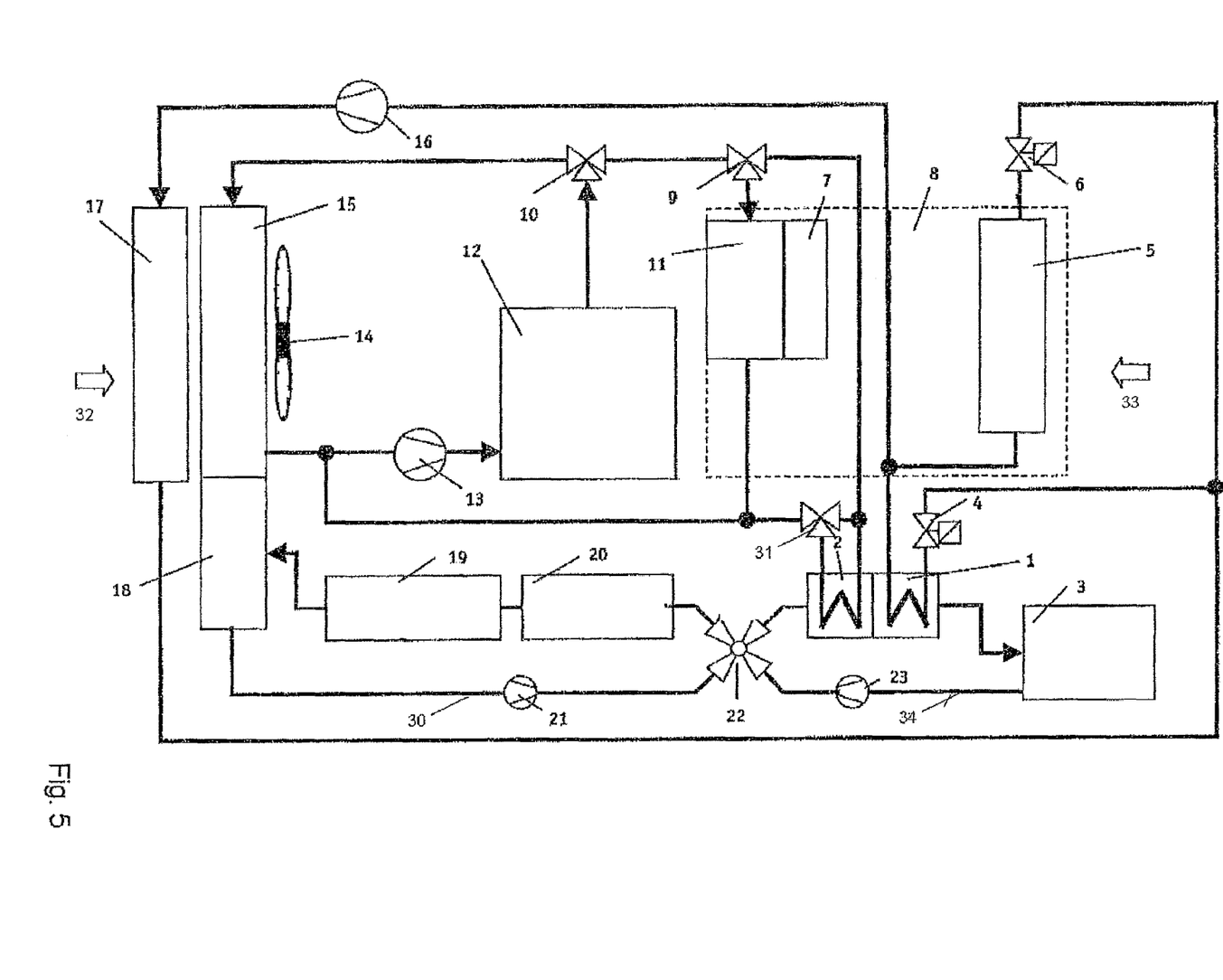
FIG. 5 is a schematic illustration of a device for exchanging heat in which said second and said third coolant circuits are connected by means of a control element.

FIG. 5 is an embodiment of the invention in which the second and the third cooling circuit are or can be connected by means of a four-way valve 22. In accordance with the teachings of the present invention, however, four-way valve 22 may be replaced by two three-way valves (not shown). A corresponding connection of the valve or the valves allows the components 3, 19 and 20 to be connected in a first circuit, and, for example, in mild temperature conditions, to be cooled by means of the heat exchanger 18. A connection is provided for this purpose such that the two auxiliary pumps 21 and 23 can be connected so as to be switched on or off depending on the setting of the valve 22. In one operating stage, as described above, only one of the two pumps, for example 21, would operate, wherein the other pump allows the fluid to flow even in a switched-off state. By this method, the coolant is supplied to the accumulator for cooling via the pump 21 and via the fluid lines to components 19 and 20. The sequence of flow is determined based on the lowest temperature to be achieved for the accumulator.

A second operating position provides for the two systems to be separated from each other such that the components 19 and 20 are cooled by means of the second cooling system 30 via the heat exchanger 18. In this case, the accumulator circuit or the third cooling circuit 34, respectively, can then be cooled, for example, via the heat exchanger 1. Heat exchanger 1 is incorporated in the refrigerant flow of the cooling system such that a low temperature is obtained specifically for one component at high ambient temperatures. In this way, an optimum operating temperature can be achieved in controlled systems that use as inputs both the ambient temperature and the operating temperature of the battery.

If the temperatures are very low, the accumulator circuit 34 (third cooling circuit) or the second and third cooling circuits together, may provide heat so as to ensure an optimum operating temperature for operation of the individual vehicle components.

Figure 6:
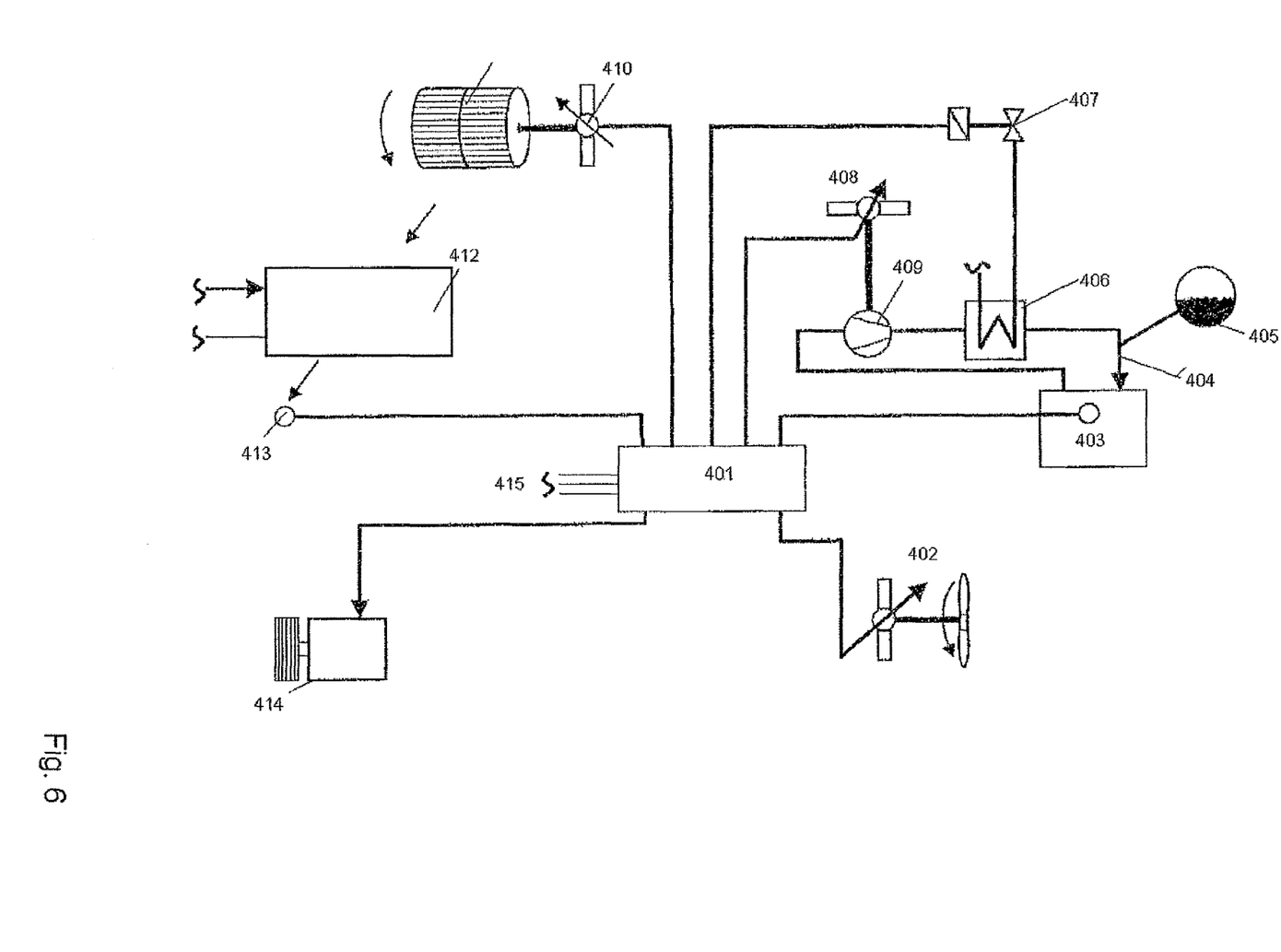
FIG. 6 is a schematic illustration of a control diagram for controlling an accumulator and a passenger compartment.

FIG. 6 is a schematic diagram of a control of the temperatures of the accumulator and the passenger compartment. Reference numeral 401 designates an electric control unit that may be a pulse-width modulated electric control. This device controls a plurality of valves in connection with sensors that are used to determine the temperature for a directed control. This device may cause both the speed of the cooling fan 402 and the pump rate of the pump 409 to be adjusted by means of the control unit 408. Control device 410 of fan 411 can further control or regulate the amount of air. The opening of the thermostatic expansion valve 407 is also controllable in connection with the use of various sensors, e.g., temperature sensors 403 which, controls the operating temperature of the accumulator, sensor 413, which controls the temperature inside the passenger compartment, or sensor 414, which controls the volume flow rate of the compressor 414. Both the quantity and the rate can be controlled or used as the actuating variable, respectively. Additional sensors or control devices 415 may also be provided.

Reference numeral 405 further designates an expansion tank for a coolant. Reference numeral 406 designates the heat exchanger between the coolant of the third cooling circuit and the refrigerant of the air conditioning system or of at least one first cooling circuit.

While this invention has been described with an emphasis upon particular embodiments, it should be understood that the foregoing description has been limited to the presently contemplated best mode for practicing the invention. It will be apparent that various modifications may be made to the invention, and that some or all of the advantages of the invention may be obtained. Also, the invention is not intended to require each of the above-described features and aspects or combinations thereof. In many instances, certain features and aspects are not essential for practicing other features and aspects. The invention should only be limited by the appended claims and equivalents thereof, since the claims are intended to cover other variations and modifications even though not within their literal scope.

What we claimed is:

1. An apparatus for exchanging heat in motor vehicles to raise or lower the temperatures of vehicle components comprising:
   a pump to pump coolant through at least one cooling circuit;
   a first cooling circuit that includes at least two heat exchangers and at least one heat reservoir;
   a second cooling circuit that exchanges thermal energy with at least a first vehicle component, wherein the second cooling circuit comprises a second pump to pump coolant through the second circuit;
   a third cooling circuit that is selectively connectable with the second cooling circuit and that exchanges thermal energy with at least a second vehicle component, wherein the third cooling circuit comprises a third pump to pump coolant through the third circuit; and
   a plurality of control elements that selectively connect the first cooling circuit with at least one of the second and third cooling circuits, and further independently selectively connect the second and third cooling circuits to each other;
   wherein the apparatus is capable of operating in at least two operating modes, and
   wherein
   in a first operating mode the second and third cooling circuits are connected to each other and only one of the second and third pumps is operating, and
   in a second operating mode the second and third cooling circuits are separated from each other and both of the second and third pumps are operating.

2. The apparatus for exchanging heat according to claim 1, wherein the plurality of control elements comprise a four-way valve to independently selectively connect the second and third cooling circuits to each other.

3. The apparatus for exchanging heat according to claim 1, wherein the plurality of control elements comprise two three-way valves to independently selectively connect the second and third cooling circuits to each other.

4. The apparatus for exchanging heat according to claim 1, wherein at least one of the second pump and the third pump is capable of allowing a fluid flow in a switched-off state.

5. An apparatus for exchanging heat in motor vehicles to raise or lower the temperatures of vehicle components comprising:
   a pump to pump coolant through at least one cooling circuit;
   a first cooling circuit including at least two heat exchangers and at least one heat reservoir;
   a second cooling circuit that exchanges thermal energy with at least a first vehicle component wherein the second cooling circuit comprises a second pump to pump coolant through the second circuit;
   a third cooling circuit that is selectively connectable with the second cooling circuit and that exchanges thermal energy with at least a second vehicle component wherein the third cooling circuit comprises a third pump to pump coolant through the third circuit; and
   a plurality of control elements that selectively connect the first cooling circuit with at least one of the second and third cooling circuits;
   wherein the apparatus for exchanging heat is capable of operating in at least two operating modes, and,
   wherein, in a first operating mode the second and third cooling circuits are connected to each other and only one of the second and third pumps is operating, and in a second operating mode the second and third cooling circuits are separated from each other and both the second and third pumps are operating.

* * * * *